(12) United States Patent
Gibeau et al.

(10) Patent No.: US 10,083,553 B2
(45) Date of Patent: Sep. 25, 2018

(54) ELECTRIC VEHICLE SUPPLY EQUIPMENT DIAGNOSTIC METHOD AND ASSEMBLY

(71) Applicant: FORD GLOBAL TECHNOLOGIES, LLC, Dearborn, MI (US)

(72) Inventors: John Paul Gibeau, Canton, MI (US); Susan Curry, Canton, MI (US); Arthur M. Rutyna, Plymouth, MI (US); Sriram Jala, Northville, MI (US); Brittany Connolly, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 15/049,380

(22) Filed: Feb. 22, 2016

(65) Prior Publication Data
US 2017/0243411 A1    Aug. 24, 2017

(51) Int. Cl.
*G07C 5/08* (2006.01)
*B60L 3/12* (2006.01)
*B60L 11/18* (2006.01)

(52) U.S. Cl.
CPC .............. *G07C 5/085* (2013.01); *B60L 3/12* (2013.01); *B60L 11/1816* (2013.01); *B60L 11/1838* (2013.01); *G07C 2205/02* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
USPC ....................................................... 701/29.1
See application file for complete search history.

(56) References Cited

U.S. PATENT DOCUMENTS

| | | | |
|---|---|---|---|
| 6,629,029 B1* | 9/2003 | Giles | G01M 17/007 701/31.4 |
| 6,993,421 B2* | 1/2006 | Pillar | A62C 27/00 701/29.4 |
| 7,184,866 B2* | 2/2007 | Squires | A62C 27/00 340/426.15 |
| 8,860,366 B2 | 10/2014 | Muller et al. | |
| 9,156,362 B2 | 10/2015 | Soden et al. | |
| 9,197,094 B2 | 11/2015 | Van Wiemeersch et al. | |
| 2004/0000909 A1* | 1/2004 | Kablaoui | B60L 3/0023 324/326 |
| 2009/0160451 A1* | 6/2009 | Bertness | G01R 1/06 324/426 |
| 2009/0184689 A1* | 7/2009 | Kressner | G01R 22/063 320/162 |
| 2011/0029146 A1 | 2/2011 | Mueller et al. | |
| 2011/0175569 A1* | 7/2011 | Austin | B60L 11/1824 320/109 |

(Continued)

OTHER PUBLICATIONS

Electric Vehicle Monitoring, Telematics, & Fleet Management, Fleet Car Magazine, Dec. 28, 2015, Retreived From: http://fleetcarma.com/platform/electric-vehicles/fleet-management/.

*Primary Examiner* — Tyler D Paige
(74) *Attorney, Agent, or Firm* — Carlson, Gaskey & Olds, P.C.

(57) ABSTRACT

An exemplary reporting method includes the steps of receiving diagnostic data from electric vehicle supply equipment, and then reporting the diagnostic data through an interface of an electrified vehicle. An exemplary electrified vehicle assembly includes a controller of an electrified vehicle. The controller is configured to receive diagnostic data from electric vehicle supply equipment. The exemplary assembly further includes an interface of the electrified vehicle configured to report the diagnostic data.

22 Claims, 2 Drawing Sheets

(56) References Cited

U.S. PATENT DOCUMENTS

| | | | |
|---|---|---|---|
| 2011/0196545 A1* | 8/2011 | Miwa | B60K 6/365 |
| | | | 700/292 |
| 2011/0202418 A1 | 8/2011 | Kempton et al. | |
| 2012/0025842 A1* | 2/2012 | Gibbs | G01R 31/045 |
| | | | 324/538 |
| 2012/0041855 A1* | 2/2012 | Sterling | B60L 3/0046 |
| | | | 705/34 |
| 2012/0330494 A1* | 12/2012 | Hendrix | B60L 11/1838 |
| | | | 701/29.3 |
| 2013/0031318 A1* | 1/2013 | Chen | H02J 7/00 |
| | | | 711/154 |
| 2013/0132011 A1* | 5/2013 | Mano | G01R 31/3679 |
| | | | 702/63 |
| 2013/0254097 A1* | 9/2013 | Marathe | G07F 15/005 |
| | | | 705/39 |
| 2014/0279707 A1* | 9/2014 | Joshua | G06Q 30/0283 |
| | | | 705/400 |
| 2015/0177305 A1* | 6/2015 | Janarthanam | G01R 31/006 |
| | | | 324/503 |
| 2015/0224891 A1* | 8/2015 | Petrosian | B60L 11/1851 |
| | | | 701/31.4 |
| 2015/0243109 A1* | 8/2015 | Tseng | G07C 5/0808 |
| | | | 701/29.1 |
| 2016/0086390 A1* | 3/2016 | Berkobin | G07C 5/008 |
| | | | 701/1 |
| 2016/0104328 A1* | 4/2016 | Chen | G07C 5/0858 |
| | | | 701/31.5 |
| 2016/0238667 A1* | 8/2016 | Palmisano | B60R 16/023 |
| 2017/0243411 A1* | 8/2017 | Gibeau | B60L 3/12 |

* cited by examiner

ELECTRIC VEHICLE SUPPLY EQUIPMENT DIAGNOSTIC METHOD AND ASSEMBLY

TECHNICAL FIELD

This disclosure relates generally to reporting diagnostic data and, more particularly, to reporting diagnostic data from electric vehicle supply equipment (EVSE) through an electrified vehicle. Because the diagnostic data is reported through the electrified vehicle, a specialized tool is not required to retrieve diagnostic data from the EVSE.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Electric vehicle supply equipment (EVSE) can connect the electrified vehicle to a grid power source. A cordset is an example type of EVSE. Power moves from the grid power source through the cordset to the electrified vehicle. The power is used to charge the battery. Retrieving diagnostic data from the cordset and other types of EVSE can require specialized tools. Further, some EVSE must be partially disassembled to retrieve diagnostic data.

SUMMARY

A diagnostic reporting method according to an exemplary aspect of the present disclosure includes, among other things, receiving diagnostic data from electric vehicle supply equipment, and reporting the diagnostic data through an interface of an electrified vehicle.

In a further non-limiting embodiment of the foregoing method, the method further comprises reporting the diagnostic data using a controller area network (CAN) bus protocol.

In a further non-limiting embodiment of any of the foregoing methods, the interface is an on-board diagnostic (OBD) port.

In a further non-limiting embodiment of any of the foregoing methods, the diagnostic data is received from the electric vehicle supply equipment as a signal, and the method further comprises converting the signal to a diagnostic code prior to the reporting.

In a further non-limiting embodiment of any of the foregoing methods, the signal is a pulse width modulated signal.

In a further non-limiting embodiment of any of the foregoing methods, the method further comprises converting the signal using a controller of the electrified vehicle.

In a further non-limiting embodiment of any of the foregoing methods, the controller is a battery charger control module that interfaces with a battery traction system of the electrified vehicle.

In a further non-limiting embodiment of any of the foregoing methods, the method further comprises receiving AC power from the electric vehicle supply equipment and converting AC power to DC power using the controller.

In a further non-limiting embodiment of any of the foregoing methods, the diagnostic data is received from a pilot line of the electric vehicle supply equipment.

In a further non-limiting embodiment of any of the foregoing methods, the method further comprises charging a traction battery of the electrified vehicle using power sent to the electrified vehicle through the electric vehicle supply equipment from an external power source.

In a further non-limiting embodiment of any of the foregoing methods, the electric vehicle supply equipment is a cordset.

A diagnostic method according to yet another exemplary aspect of the present disclosure includes, among other things, sending diagnostic data from electric vehicle supply equipment to an electrified vehicle.

In a further non-limiting embodiment of the foregoing method, the method further comprises executing a self-test on the electric vehicle supply equipment to collect electric vehicle supply equipment diagnostic data.

In a further non-limiting embodiment of any of the foregoing methods, the electric vehicle supply equipment is connected to an external power source and the electrified vehicle during both the self-test and the sending.

In a further non-limiting embodiment of any of the foregoing methods, the method further comprises sending the diagnostic data to the electrified vehicle using a pilot line of the electric vehicle supply equipment.

An electrified vehicle assembly according to yet another exemplary aspect of the present disclosure includes, among other things, a controller of an electrified vehicle. The controller is configured to receive diagnostic data from electric vehicle supply equipment. An interface of the electrified vehicle is configured to report the diagnostic data.

In a further non-limiting embodiment of the foregoing assembly, the interface is an on-board diagnostic (OBD) port configured to report the diagnostic data to a controller area network (CAN) tool using a CAN protocol.

In a further non-limiting embodiment of any of the foregoing assemblies, the electrified vehicle includes a traction battery configured to charge using power transmitted from an external power source through the electric vehicle supply equipment to the vehicle.

In a further non-limiting embodiment of any of the foregoing assemblies, the controller is a control module that interfaces with a battery traction system of the electrified vehicle In a further non-limiting embodiment of any of the foregoing assemblies, the diagnostic data is received from a pilot line of the electric vehicle supply equipment.

In a further non-limiting embodiment of any of the foregoing assemblies, the diagnostic data is received as a bit streamed signal.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to reporting Electric Vehicle Supply Equipment (EVSE) diagnostic data, such as cordset diagnostic data, through an interface of an electrified vehicle. In some examples, the electrified vehicle's CAN bus is used to report EVSE diagnostic codes.

The cordset diagnostic data can be reported, for example, through an OBD port of the electrified vehicle to a CAN tool. Since the cordset diagnostic data is reported through the electrified vehicle, the cordset diagnostic data can be retrieved without requiring a specialized tool to interface with the cordset, and further without requiring any disassembly of the cordset.

Figure 1:
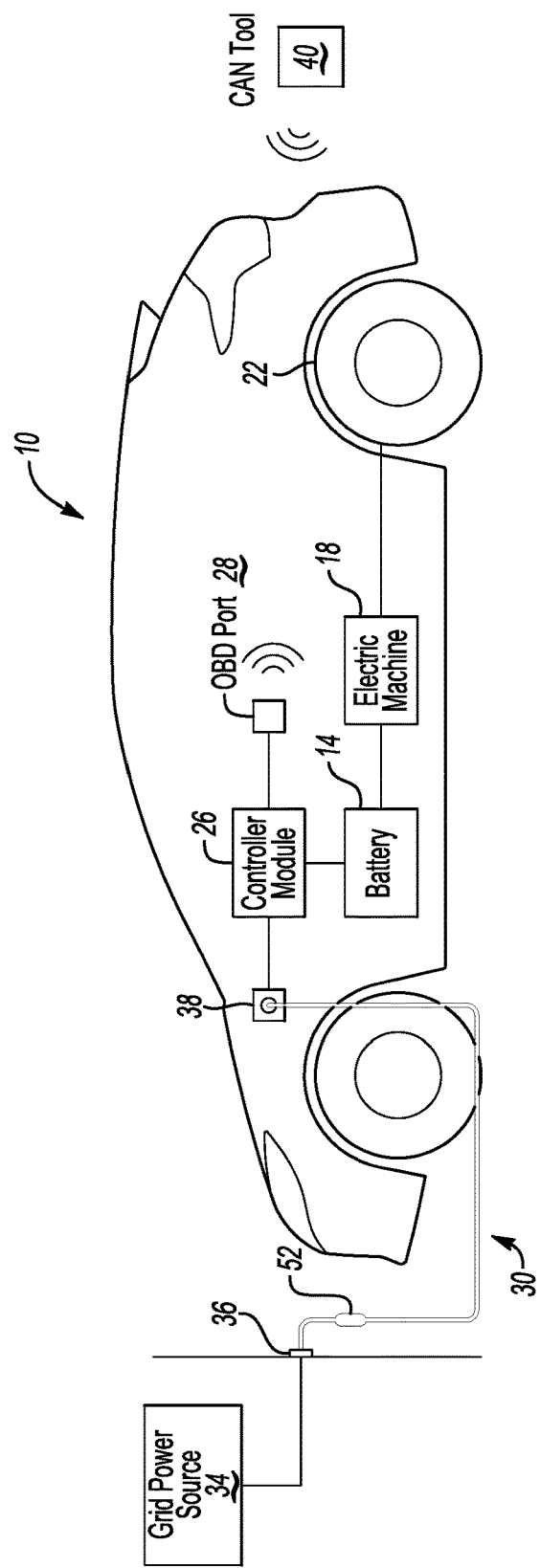
FIG. 1 shows a side view of exemplary Electric Vehicle Supply Equipment (EVSE) electrically coupling an electrified vehicle to a grid power source.

Referring to FIG. 1, an example electrified vehicle 10 includes a battery 14, an electric machine 18, wheels 22, a controller module 26, and an on-board diagnostic (OBD) port 28.

In this example, the electric machine 18 can receive electric power from the battery 14. The electric machine 18 converts the electric power to torque to drive the wheels 22. The exemplary battery 14 is a relatively high voltage traction battery.

The exemplary vehicle is an all-electric vehicle. In other examples, the electrified vehicle 10 is a hybrid electric vehicle, which selectively drives wheels using torque provided by an internal combustion engine instead of, or in addition to, the electric machine.

The OBD port 28 is an interface of the electrified vehicle 10. Other interfaces can include wireless interfaces. The interfaces of the electrified vehicle 10 permit communication between the electrified vehicle 10 and another device different than the electrified vehicle.)

To charge the battery 14, a cordset 30 electrically couples the electrified vehicle 10 to an external power source outside the electrified vehicle 10, such as a grid power source 34. When the cordset 30 is coupled to the electrified vehicle 10 and the grid power source 34, the battery 14 can receive power from the grid power source 34. The power flows from the grid power source 34 through the cordset 30 to the battery 14. The cordset 30 can includes a plug 36 to connect to the grid power source 34 and another plug 36 to connect to the electrified vehicle 10.

The cordset 30 is a type of EVSE that is portable. Other examples of EVSE can include fixed residential or commercial charging stations. The EVSE is separate from the electrified vehicle 10.

Figure 2:
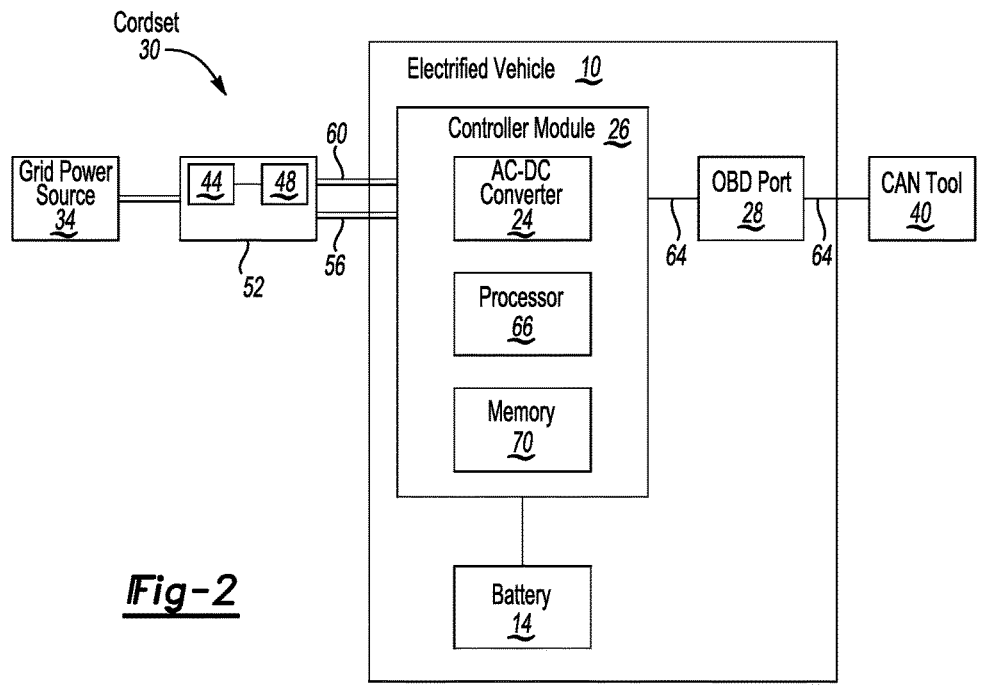
FIG. 2 shows a highly schematic view of the FIG. 1 EVSE and electrified vehicle.

Referring now to FIG. 2, the exemplary cordset 30 further includes a processor 44 and a memory portion 48 within a housing 52. When the cordset 30 is electrically coupled to the grid power source 34 to the electrified vehicle 10, a pilot line 56 and power lines 60 extend from the housing 52 to the plug 38. The pilot line 56 can communicate data to the controller module 26 of the electrified vehicle 10, and can be considered a communication line in some examples. The power lines 60 can transfer power from the cordset 30 to the electrified vehicle 10.

The example cordset 30 can generate diagnostic data. The diagnostic data may include diagnostic trouble codes (DTCs) stored internally within the processor 44 or the memory portion 48 of the cordset 30.

The diagnostic data and, in particular, the DTCs, can reveal issues pertaining to operation of the cordset 30. Example DTCs can correspond to, for example, an overcurrent fault, a ground fault interruption, an internal temperature exceeding a threshold value, etc. A person having skill in this art and the benefit of this disclosure would understand these and other types of information revealed by DTCs and other types of cordset diagnostic data.

The cordset 30 can store as many DTCs as required. In some examples, the cordset 30 can store up to ten DTCs. In other examples, the cordset 30 can store up to 50 DTCs.

In this example, diagnostic data from the cordset 30 can be reported through the OBD port 28 of the electrified vehicle 10. A technician can engage the OBD port 28 with the CAN tool 40 to retrieve the diagnostic data from the cordset 30. The CAN tool 40 includes a pin type connector that engages a corresponding pin type connector of the OBD port 28. Other types of connections are possible, such as a wireless connection between the CAN tool 40 and the OBD port 28. FIG. 1 depicts a wireless connection between the CAN tool 40 and the OBD port 28. FIG. 2 schematically depicts a pin or wired connection between the CAN tool 40 and the OBD port 28.

The technician would have access to the CAN tool 40, since CAN tools are commonly used to retrieve electrified vehicle diagnostic data, such as DTCs generated by the electrified vehicle 10, are readily available. CAN tools 40 are often connected to the OBD port 28 to diagnose issues with OBD compliant electrified vehicles and OBD compliant conventional vehicles.

The example CAN tool 40 can support CAN protocols and OBD protocols. The example CAN tool 40 can retrieve DTCs that are generic or specific to a manufacturer of the electrified vehicle 10, the cordset 30, or both.

In this example, diagnostic data associated with the cordset 30 is communicated to the electrified vehicle 10 along the pilot line 56. The signals communicated along the pilot line 56 can be pulse width modulated signals. The controller module 26 receives the bit stream from the cordset 30 and can convert the signal to controller area network (CAN) bus protocol. The conversion can be required since the example cordset 30 may not be a module on the CAN bus of the electrified vehicle 10. The converted diagnostic data from the cordset 30 can then be reported through the OBD port 28 to the CAN tool 40 using the CAN bus protocol. The converted diagnostic data is communicated along a CAN communication line 64.

The controller module 26 is a vehicle controller module or charger of the electrified vehicle 10. The controller module 26 can be referred to as a battery charger control module. The controller module 26 interfaces with a battery traction system. In another example, the vehicle 10 configured for DC charging and the controller module is a DC Gateway Module (DCGM).

The controller module 26 includes a processor 66 and a memory portion 70. The processor 66 can be programmed to execute a program stored in the memory portion 70. The program can be stored in the memory portion 70 as software code. The program stored in the memory portion 70 can include one or more additional or separate programs, each of which includes an ordered listing of executable instructions for implementing logical functions associated with, for example, converting the bit stream data received from the pilot line 56 of the cordset 30 into the CAN bus protocol.

The controller module 26 further includes an AC to DC converter 74 that converts AC power received from the power lines 60 into DC power used to recharge the battery 14. In some examples, the cordset 30 is used to fast charge the electrified vehicle 10. In a fast charge, the cordset 30 may couple to a DC grid power source such that converting AC power with the converter 74 is not required.

Figure 3:
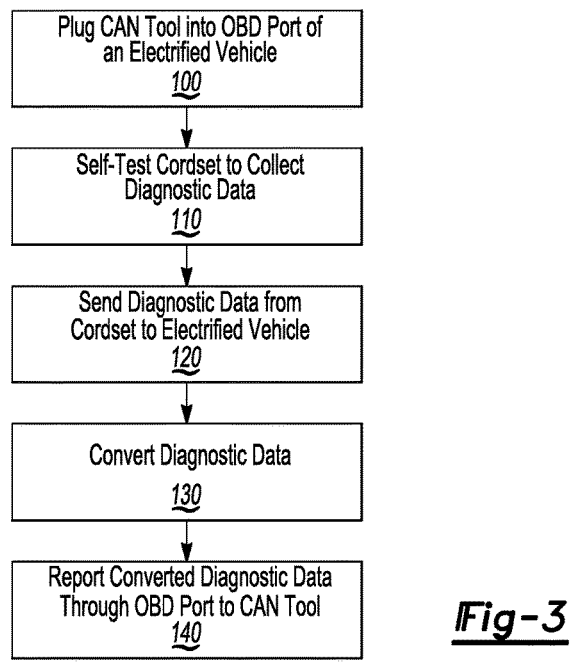
FIG. 3 shows an exemplary method of retrieving diagnostic data from the FIGS. 1 and 2 EVSE.

Referring now to FIG. 3 with continuing reference to FIG. 2, an exemplary cordset reporting method includes a step 100 of plugging or engaging the CAN tool 40 with the OBD port 28 of the electrified vehicle 10. The cordset 30 is plugged into a wall outlet to engage the grid power source 34 and further plugged into the electrified vehicle 10. A technician can plug the CAN tool 40 into the OBD port 28 to retrieve diagnostic data associated with the cordset 30.

At a step 110, the cordset 30 executes a self-test program to collect cordset diagnostic data. The self-test of the cordset 30 can be initiated from the CAN tool 40, from the controller module 26, or both. The self-test may include opening and closing the S2 switch of the cordset 30.

At a step 120, the cordset sends diagnostic data from the cordset 30 to the electrified vehicle 10. The diagnostic data is collected during the self-test of the cordset at the step 110. In this example, data can communicate from the cordset 30 along the pilot line 56 as a pulse width signal providing the data as a bitstream sequence. The duty cycles of the pulses within the pulse width modulated signals can be varied to provide different bits. In another example, the diagnostic data is communicated along the pilot line 56 as a carrier wave on top of a pulse width modulated signal.

At a step 130, the diagnostic data is converted. As previously described, conversion may include converting the bitstream into diagnostic codes suitable for communication with the CAN bus protocol.

At a step 140, the converted diagnostic data is reported through the OBD port 28 to the CAN tool 40. The service technician can then receive the diagnostic data associated with the cordset 30 using the CAN tool 40.

Features of some of the disclose examples include retrieving cordset diagnostic data without requiring a specialized tool to interface with the cordset. Further, disassembling the cordset, such as removing the housing, is not required to retrieve the cordset diagnostic data.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A diagnostic reporting method, comprising:
    receiving diagnostic data from electric vehicle supply equipment; and
    reporting the diagnostic data through an interface of an electrified vehicle to a device different than the electrified vehicle.

2. The method of claim 1, further comprising reporting the diagnostic data using a controller area network (CAN) bus protocol.

3. The method of claim 2, wherein the device is a CAN tool external to the electrified vehicle.

4. The method of claim 1, wherein the interface is an on-board diagnostic (OBD) port.

5. The method of claim 1, wherein the diagnostic data is received from the electric vehicle supply equipment as a signal, and further comprising converting the signal to a diagnostic code prior to the reporting.

6. The method of claim 5, wherein the signal is a pulse width modulated signal.

7. The method of claim 5, further comprising converting the signal using a controller of the electrified vehicle.

8. The method of claim 7, wherein the controller is a battery charger control module that interfaces with a traction battery system of the electrified vehicle.

9. The method of claim 1, wherein the diagnostic data is received from a pilot line of the electric vehicle supply equipment.

10. The method of claim 1, further comprising charging a traction battery of the electrified vehicle using power sent to the electrified vehicle through the electric vehicle supply equipment from an external power source, the diagnostic data generated by the electric vehicle supply equipment.

11. The method of claim 1, wherein the electric vehicle supply equipment is a cordset.

12. The method of claim 1, wherein the receiving is at a controller module of the electrified vehicle and the reporting is from the controller module of the electrified vehicle.

13. A diagnostic method, comprising:
    sending diagnostic data from electric vehicle supply equipment to an electrified vehicle for reporting to a controller area network (CAN) tool that is external to the electrified vehicle.

14. The method of claim 13, further comprising executing a self-test on the electric vehicle supply equipment to collect the diagnostic data generated by the electric vehicle supply equipment.

15. The method of claim 14, wherein the electric vehicle supply equipment is connected to an external power source and the electrified vehicle during both the self-test and the sending.

16. The method of claim 13, further comprising sending the diagnostic data to the electrified vehicle using a pilot line of the electric vehicle supply equipment.

17. The method of claim 13 including using a processor of the electric vehicle supply equipment for the sending.

18. An electrified vehicle assembly, comprising:
    a controller of an electrified vehicle, the controller configured to receive diagnostic data from electric vehicle supply equipment; and
    an interface of the electrified vehicle configured to report the diagnostic data to a device different than the electrified vehicle.

19. The electrified vehicle assembly of claim 18, wherein the interface is an on-board diagnostic (OBD) port configured to report the diagnostic data to a controller area network (CAN) tool using a CAN protocol.

20. The electrified vehicle assembly of claim 18, wherein the electrified vehicle includes a traction battery configured to charge using power transmitted from an external power source through the electric vehicle supply equipment to the vehicle.

21. The electrified vehicle assembly of claim 18, wherein the diagnostic data is received from a pilot line of the electric vehicle supply equipment.

22. The electrified vehicle assembly of claim 18, wherein the diagnostic data is received as a bit streamed signal.

* * * * *